Feb. 12, 1952      F. G. LOGAN      2,585,332
ELECTRIC CONTROLLING APPARATUS

Filed Feb. 10, 1948      2 SHEETS—SHEET 1

INVENTOR.
FRANK G. LOGAN
BY
Lawrence K. Sager
his ATTORNEY

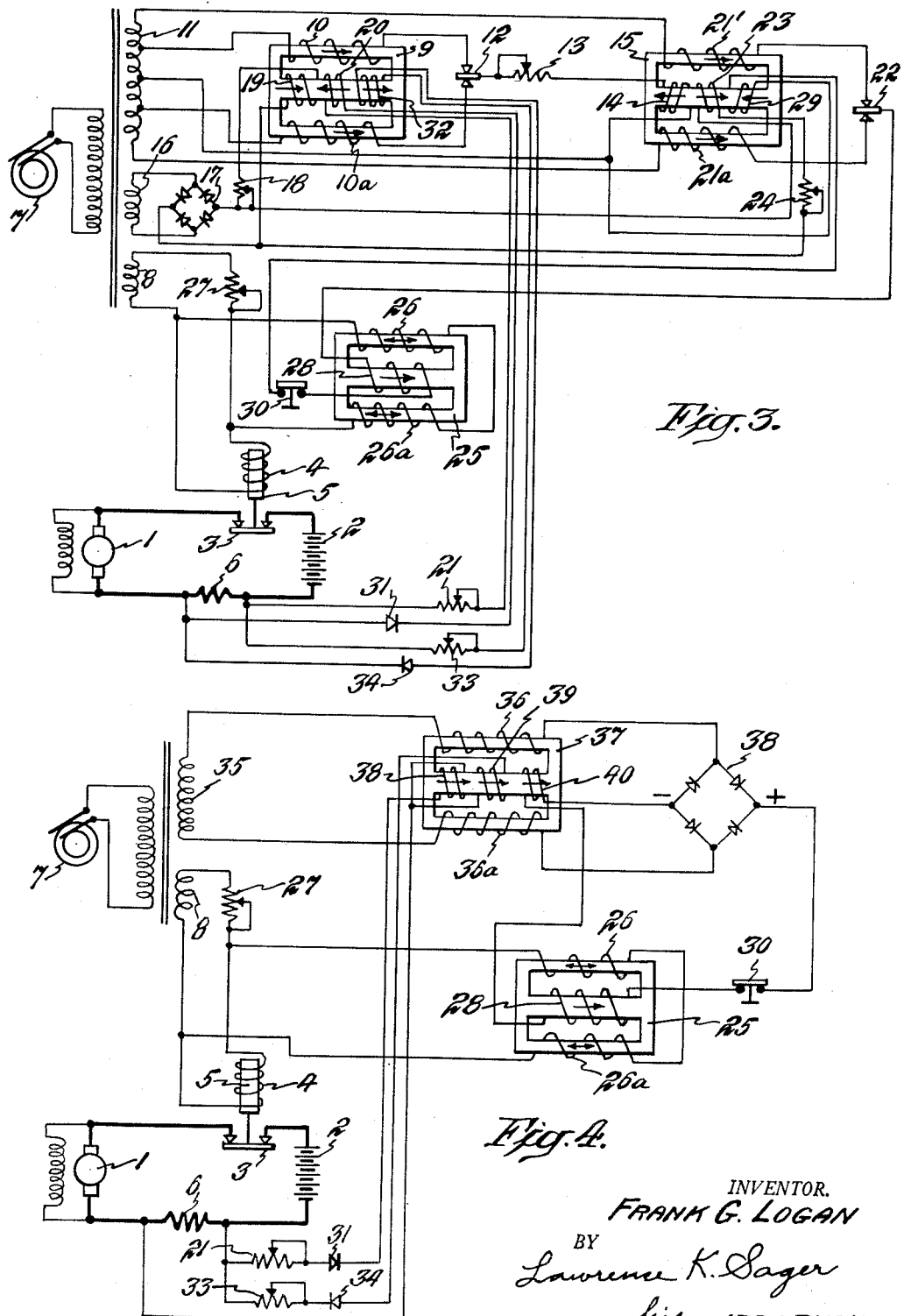

Patented Feb. 12, 1952

2,585,332

UNITED STATES PATENT OFFICE 2,585,332

ELECTRIC CONTROLLING APPARATUS

Frank G. Logan, Yonkers, N. Y., assignor, by mesne assignments, to Vickers Incorporated, Detroit, Mich., a corporation of Michigan Application February 10, 1948, Serial No. 7,480

13 Claims. (Cl. 175—294)

1

This invention relates particularly to the control of a circuit carrying a direct current in a normal intended direction which when reversed to a predetermined amount will cause the automatic control of the circuit. It also relates to overload control of the circuit when the current is in the normal direction. It is especially applicable to a battery charging circuit but is also useful for other applications where reverse current control is desirable.

The main object of the invention is to control a switch, circuit breaker or contactor in a circuit for interrupting the circuit, or otherwise controlling it, upon the passage of a reverse current and to accomplish this by a refined adjustment of the amount of the reverse current required to cause actuation of the circuit interrupter. A small reverse current in many cases, such as in battery charging systems or devices, is not objectionable and it would be undesirable to interrupt the circuit unnecessarily; but if the reverse current exceeds a predetermined amount, then the circuit should be interrupted quickly and reliably. Another object is to provide convenient and close adjustment of the amount of reverse current which will cause actuation of the circuit interrupter. A further object is to provide controlling means which is shockproof with reference to mechanical shocks and jars and have no movable parts. Another object is to permit the relay or controlled switch to be located at any convenient place away from the controlling apparatus; and permit the use of comparatively small connecting wires to the switch and to the controlled circuit. Another object is to secure an amplified controlling response upon comparatively small changes in the controlled circuit. A further object is to provide protection against failure of voltage of the alternating supply current to the controlling means. Another object is also to provide protection against overload current in the normal direction in the controlled circuit. Other objects and advantages will be understood from the following description and accompanying drawings which illustrate preferred embodiments of the invention.

Figure 1:
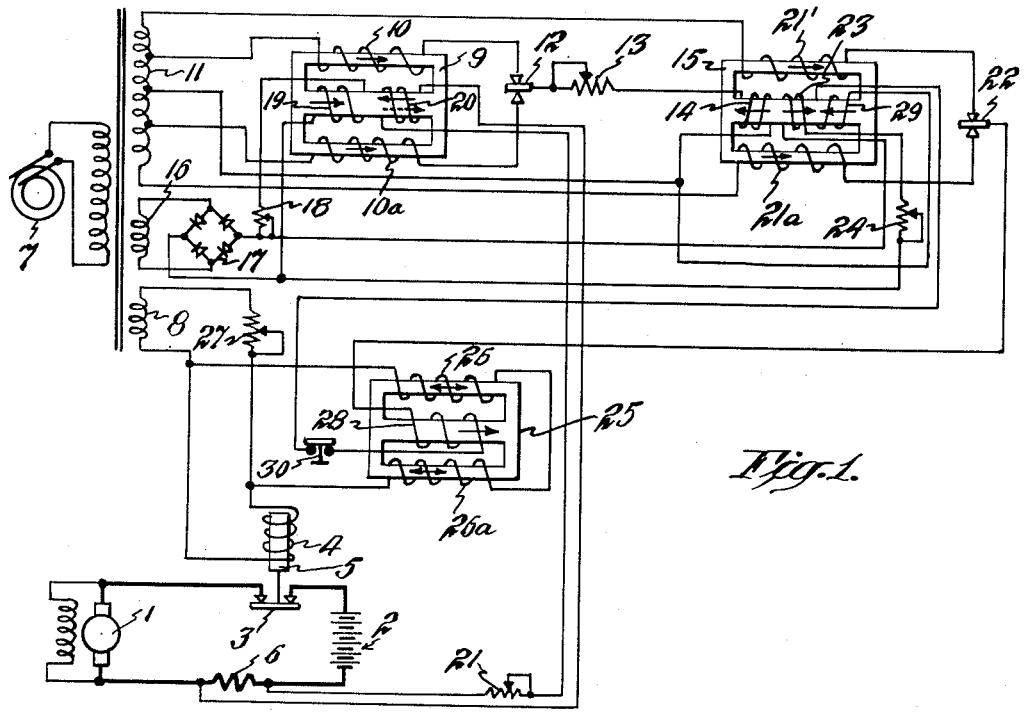
Figure 2:
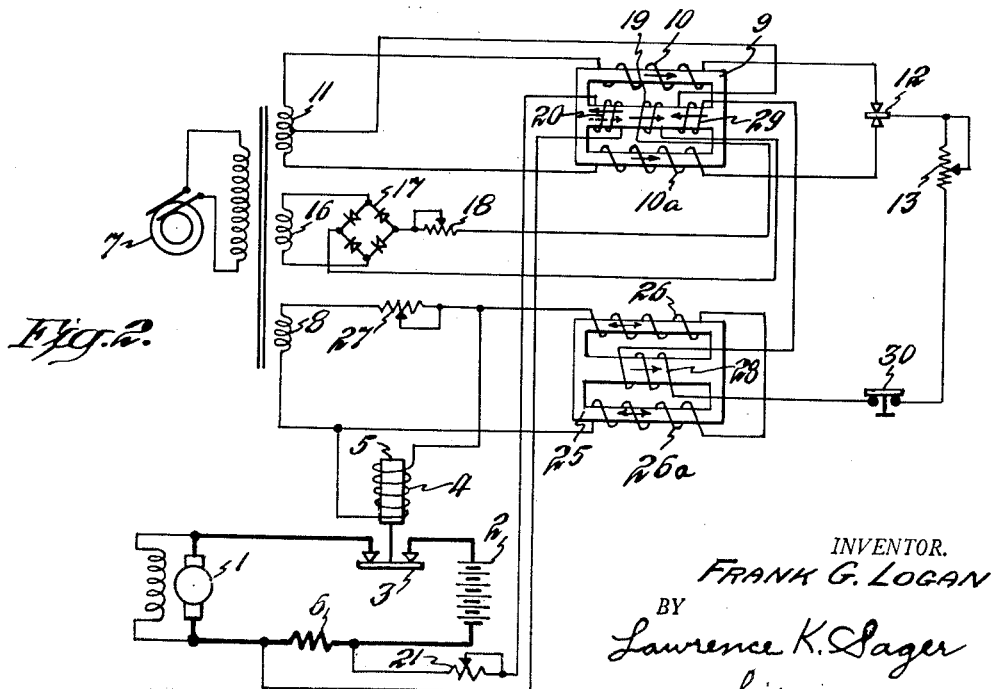

Fig. 1 is a diagram wherein two stages of amplification of the controlling factor is provided; Fig. 2 is a diagram wherein one stage of amplification is utilized; Fig. 3 is a diagram showing provision for normal current overload as well as the reverse current control; and Fig. 4 is a diagram showing a modification with overload and reverse current control.

2

Referring to Fig. 1, the circuit to be controlled is shown supplied by a source 1 of direct current charging a battery 2 through a circuit interrupter 3. The latter may be of any form or type controlled by a winding 4 which for simplicity is indicated as a solenoid winding controlling a plunger 5 which in turn controls the opening of the switch 3. In series in the charging circuit is inserted a shunt 6 of low resistance.

A source 7 of alternating current is indicated as supplying the primary of a transformer having a plurality of secondary windings. One of these windings 8 supplies current to the winding 4 of the circuit breaker and when this winding is normally energized, it maintains the circuit breaker closed.

The first stage of the amplifying means comprises a reactor having a core 9 shown as of the three-legged type. One of the outside legs is indicated as having an anode winding 10 connected to the secondary winding 11 of the transformer. The other outside leg has an anode winding 10a which is likewise connected to the secondary winding 11. The anode windings are connected at their other terminals to a full-wave rectifier 12, the output from which, after passing through an adjustable resistor 13, supplies a controlling winding 14 on a reactor core 15 whereby the second stage of amplification is accomplished. From the winding 14 a circuit returns to the secondary winding 11 by connection thereto at a point mid-way between the connections of the anode windings 10 and 10a. The magnetomotive forces of the windings 10 and 10a are such as to cause their resultant flux to pass through the middle leg of the core 9 in the same direction, as indicated by the direction of the arrows on the outside legs of the core. In this assumed direction from left to right, it is apparent that the pulsating currents in the anode windings will cause the flux due thereto to pass from right to left in the middle leg of the core. A secondary winding 16 of the transformer is shown as supplying a rectifier 17 which in turn supplies current, through an adjustable resistor 18, to a winding 19 on the middle leg of the reactor core 9. The direction of current in the winding 19 is such as to cause its magnetomotive force to oppose the magnetomotive force of the windings 10, 10a, as indicated by the arrow on the winding 19. The purpose of this winding is to bias the magnetization of the core 9 to the region of the steep portion of the magnetization curve so that small changes in the control winding of the core will produce comparatively large changes in the resultant magnetization of the core. The control winding 20 is likewise on the middle leg of the core 9 and is supplied with direct current derived from the shunt 6 in the controlled circuit, the terminals of the control winding 20 being connected to the terminals of the shunt 6 through an adjustable resistor 21. The direction of current in the control winding 20 is such that when the current through the shunt 6 of the controlled circuit is in the normal charging direction, the magnetomotive force of the control winding 20 opposes the magnetomotive force of the main windings 10 and 10a of the reactor, as indicated by the dotted arrow on the winding 20. This normal direction of the magnetomotive force of the control winding 20 is not sufficiently high in itself to produce any responsive control under normal operating conditions but when a reverse current passes in the charging circuit from the battery 2, the magnetomotive force of the control winding 20 is then in the direction indicated by the full line arrow on the winding 20. Its magnetomotive force then acts with the magnetomotive force of the main windings 10 and 10a on the reactor and thereby pronouncedly reduces the reactance of the main windings permitting a considerable increase of current to pass to the control winding 14 of the second stage of amplification.

The reactor core 15 of this second stage is shown as a three-legged core having main anode windings 21' and 21a on its outside legs respectively. The terminals of these windings are connected to the outside terminals of the secondary winding 11, the remaining terminals of the windings 21' and 21a being connected to a full-wave rectifier 22. The return circuit from this rectifier, after passing through windings later explained, is connected to the midpoint of the secondary winding 11. The magnetomotive forces of the anode windings 21' and 21a are in the same direction in the outside legs of the core and are indicated by the arrows thereon as being from left to right. This results in the flux due thereto passing through the middle leg of the core from right to left. A bucking winding 23 on the middle leg of the core 15 is supplied with direct current from the rectifier 17 through an adjustable resistor 24 and serves the same purpose on this reactor as the bucking winding 19 on the reactor in the first stage. The winding 14 is connected in the output circuit of the first stage of amplification so that its magnetomotive force is additive to that of the magnetomotive forces of the windings 21' and 21a, as indicated by the arrow on the winding 14. Thus any material increase in the current supplied to the control winding 14 from the first stage of amplification will result in markedly increasing the magnetization of the core 15, thereby reducing the reactance of the windings 21' and 21a and increasing the output from the rectifier 22 to its controlled winding hereinafter referred to.

A third reactor is provided for directly affecting the current in the controlled winding 4 of the switch 3 in the controlled circuit. This reactor is shown as having a core 25 of the three-legged type. Windings 26 and 26a on the outside legs of this core are connected in series with each other and are supplied with alternating current from the auxiliary winding 8 of the transformer which also supplies the controlled winding 4, the windings 26 and 26a being connected in shunt to the winding 4. An adjustable resistor 27 is connected in series in the circuit which supplies current to the windings 26, 26a and 4. The winding 28 on the middle leg of the core 25 is supplied with direct current from the output of the rectifier 22 of the second stage of amplification. The circuit from the rectifier 22 after passing through the controlling winding 28 also passes through a series winding 29 on the middle leg of the reactor 15 of the second stage from which the circuit continues to the mid-point connection of the secondary winding 11 of the transformer. The direction of current in the winding 29 is made such that its magnetomotive force is additive to that of the magnetomotive forces of the anode windings 21', 21a and of the control winding 14, thereby being cumulative to the control winding 14 and increasing its responsive effect. It insures that upon the interruption of the charging circuit to the battery resulting from the passage of a reverse current of a predetermined value, the circuit breaker will not automatically reclose due to the cessation of the passage of the reverse current. This is due to the fact that the winding 29 then serves to maintain the output of the rectifier 22 to the control winding 28 sufficiently high to prevent the reclosing of the breaker.

It remains to explain the action of the change of current in the control winding 28 of the reactor 25 on the controlled winding 4 of the circuit breaker. Under normal conditions, the reactance of the windings 26 and 26a are sufficiently high to prevent them from taking enough current from the circuit of the secondary winding 8 to interfere with a sufficient supply of current to the winding 4 to maintain its controlled contacts in their normal closed position; but when a reverse current passes in the controlled charging circuit beyond the predetermined value, the current in the winding 28 due to the increased output of the first and second stages of amplification as already explained, increases the saturation of the core 25 thereby reducing the reactance of the windings 26 and 26a sufficiently to permit such an increased current to pass in these windings 26 and 26a as to increase the voltage drop in the resistor 27 to such an extent that the winding 4 can no longer maintain its controlled contacts closed. When the controlled circuit is once opened, it will not automatically reclose because although the current in the winding 28 is decreased due to the cessation of the reverse current, the pick-up value of the winding 4 is, of course, greater than the drop-out value and also because of the series winding 29 on the reactor of the second stage, as already explained.

The reclosing of the breaker in the charging circuit is accomplished by opening the circuit of the control winding 28. This is accomplished by a normally closed push button switch 30 in the circuit of the winding 28. Obviously when this circuit is opened, the interruption of its current permits the reactance of the windings 26 and 26a to become high and take much less current from their supply circuit. This results in delivering an increased current to the circuit breaker winding 4 and thereby reclose the contacts of the charging circuit.

In a number of repeated tests on the disclosure of Fig. 1, the results were practically the same in the response and time of response in effecting the opening of the charging circuit when a reverse current of a given amount passed therein, the response being rapid and dependable. In a number of tests the charging current was quickly changed from a value of 10 amperes to a reverse current of different amounts. In one adjustment of the circuit, a change from 10 amperes of charging current to a reverse current of 1.4 amperes resulted in no opening of the circuit breaker in the charging circuit; but when the current was changed from 10 amperes charging to a reverse current of 1.5 amperes, the breaker was opened in a few cycles from the time of changing from the charging current to the reverse current. The change was then made from 10 amperes charging to 1.6 amperes reverse which resulted in the opening of the breaker in about five-sixths of the time occupied when a reverse current of 1.5 was passed. In the next test the current was changed from 10 amperes charging to 1.8 amperes reverse and resulted in the breaker being tripped in a little over two-thirds of the time when a reverse current of 1.5 was passed. In another test the current was changed from 10 amperes charging to 2.0 amperes reverse with the result that the circuit breaker was tripped in two-thirds of the time required when the reverse current of 1.5 amperes was used. These results show the refinement and sensitivity of control and the greater the increase in the reverse current, the more rapid the response under comparatively small increases in the reverse current. Also by reason of the two stages of amplification and by use of the reactor which directly controls the controlled winding of the circuit breaker, a small change in the reverse current produces a pronounced change in the effect on the controlled winding of the circuit breaker.

Furthermore, upon any failure of the alternating supply current, or whenever reduced to a predetermined amount, the decreased current supplied to the controlled winding 4 will result in the opening of the circuit breaker, thereby giving protection against any failure of the alternating current supplied because the charging circuit is then protectively opened.

Another feature of this improvement with reference to the controlled winding 4 should also be noted. Here instead of the controlling current being applied through other forms of intervening devices, the reactor having the core 25 is introduced between the controlling current and the controlled winding 4. This reactor is worked on the steep portion of the magnetization curve with the result that a comparatively small change in the controlling current supplied to the winding 28, produces a pronounced change in the alternating current which is supplied to the controlled winding 4.

It is apparent that there are no movable parts in the controlling apparatus which supplies current to the controlled winding 4 and therefore this apparatus is not affected by any mechanical shocks or jars; also there are no make and break contacts in the controlling apparatus which avoids the possibility of their failure and the requirement of keeping them in good condition or the replacement thereof. Although several adjustable resistors have been described as incorporated in the controlling apparatus, it will be understood that after the desired amounts of such resistors have been ascertained, they may be made fixed resistors of determined values.

It will be observed that the only wires extending from the controlling apparatus are those connected to the controlled winding 4 and the shunt 6. These are comparatively of small size and carry currents of comparatively small values which permits the controlling apparatus to be located at any convenient selected place some distance apart from the controlled charging circuit.

In Fig. 1, two stages of amplification of change in the reverse current are disclosed but in many instances only one stage of amplification may be desired. Fig. 2 is similar to Fig. 1 with the corresponding parts designated by the same reference characters and shows only one stage of amplification. In this case the only change in the first stage of amplification of Fig. 1 is that the middle leg of the core 9 is also provided with the series winding 29 which is connected in series with the winding 28 on the reactor core 25 in the output circuit of the amplifying reactor. The mode of operation of the disclosures of Fig. 2 is the same as that described with reference to Fig. 1 with the exception that the second stage of amplification is omitted.

In some cases, in addition to securing control of the charging circuit upon the passage of a reverse current of a predetermined value, it may be desired to also protect the circuit from overload charging current. This is accomplished by the disclosure of Fig. 3 which provides separate and independent adjustment for securing the opening of the charging circuit upon the passage of a reverse current of any selected value and on the passage of a charging current of any selected value. In Fig. 3, the parts already described with reference to Figs. 1 and 2 are indicated by corresponding reference characters. In Fig. 3 a one-way electric valve 31 is introduced in series with the reverse current controlling winding 20 connected across the shunt 6. The valve 31 permits current to pass in the winding 20 only when a reverse current passes in the charging circuit. Adjustment of the resistor 21 in the circuit of the winding 20 results in securing any desired value of reverse current being selected for causing the opening of the charging circuit. An additional winding 32 is also provided on the middle leg of the core 9 which is connected to the shunt 6 through an adjustable resistor 33 and through a one-way electric valve 34. This valve permits current to flow in the winding 32 only when current passes in the charging direction in the charging circuit. The connection of the winding 32 in this circuit is such that when subjected to current its magnetomotive force opposes the magnetomotive force of the anode windings 10 and 10a instead of being additive thereto as in the case of the reverse current control winding 20.

It will be understood that the permissible value of the charging current may greatly exceed the permissible value of a reverse current in the charging circuit. Therefore the circuit breaker controlled by the winding 4 should only be opened when the charging current is very much in excess of the permissible reverse current. The value of the overload charging current which may cause the tripping of the circuit breaker by the control winding 4 may be adjusted to any desired amount by the resistor 33 in the circuit of the overload control winding 32. As an example, it may be required that the circuit breaker shall be opened when a reverse current of 1.5 amperes passes in the charging circuit whereas it may be required that the charging circuit be opened only when a charging current of 22.6 amperes flows in the charging direction and this wide difference in the current values required for opening the circuit breaker is accomplished by the disclosures of Fig. 3 as applied to the apparatus of Fig. 1. This is due to the fact that when a reverse current passes in the charging circuit the magnetization of the reactor core 9 is worked on the steep portion of the magnetization curve in the manner already explained. However, when a charging current passes in the controlled circuit, the magnetomotive force of the winding 32 is in opposition to that of the windings 10 and 10a with the result that a small value of charging current decreases the magnetization of the core 9 and thereby increases the impedance of the main windings 10 and 10a. However, as the value of the charging current increases, the initial increase of the impedance of the windings 10 and 10a is overcome and when the value of the charging current is further increased the magnetomotive force due to the winding 32 becomes sufficient in opposition to the magnetomotive force of the windings 10 and 10a as to increasingly decrease the impedance of these windings. It results that at some value of the charging current, for example at 22.6 amperes in the selected example, the impedance of the windings 10 and 10a will have the same value as when a reverse current of 1.5 amperes passed in the charging circuit. As it was assumed that a reverse current of 1.5 amperes resulted in the opening of the charging circuit, it is apparent that a charging current of 22.6 amperes will result in the same interruption of the charging circuit. As already explained, the adjustment of the overload charging current values which open the switch 3 and of the reverse current opening values are independent of each other because when either the reverse current control winding 20 or the charging current control winding 32 is subjected to current, there is no current in the other winding.

Although the disclosures of Fig. 3 are shown applied to Fig. 1, they are, of course, similarly applicable to the disclosures of Fig. 2.

Fig. 4 shows overload and reverse current control wherein a different type of controlling reactor is utilized and although not as sensitive in response as the disclosures of Figs. 1 to 3, may be satisfactorily used in some applications. In Fig. 4 the parts corresponding to those already described are designated by corresponding reference characters. In Fig. 4 the secondary winding 35 supplies current to the main windings 36 and 36a on the outside legs of the core 37. These windings supply current to the rectifier 38 indicated of the dry disk type with its four branches connected to deliver direct current from its output terminals. In Fig. 4 the windings 36 and 36a carry alternating currents instead of direct intermittent currents as in the prior figures and the windings 36 and 36a are connected to cause their magnetomotive forces to act cumulatively with each other in the outside legs of the core. A winding 38 is on the middle leg of the core 37 and is subjected to current through the one-way valve 31 when a reverse current passes through the shunt 6. A second winding 39 is also on the middle leg and is subjected to current through the one-way valve 34 only when current passes through the shunt 6 in the normal direction. The resistors 21 and 33 may be adjusted respectively to cause the control to become effective upon the passage of any desired reverse current and upon the passage of any desired current in the normal direction. When either of these predetermined values are attained, the reactance of the windings 36 and 36a is reduced sufficiently to permit the resulting increased current supplied by these windings to the rectifier and through it to the winding 28 to be of such value as to cause the circuit breaker 3 to be opened in the manner already explained.

Another winding 40 is also provided on the middle leg of the reactor core 37 which is connected in series with the winding 28 in the output circuit of the rectifier 38. This is for the purpose of preventing the circuit breaker 3 from being reclosed as soon as automatically opened, although in cases where the breaker is of the trip-open type and not magnetically closable, such an additional winding is not needed. The windings 38, 39 and 40 are connected such that their magnetomotive forces are in the same direction as each other as indicated by the arrows applied to these windings. Upon the automatic opening of the circuit breaker, the current in the winding 40 is sufficient to reduce the reactance of the windings 36 and 36a so that the current supplied to the rectifier 38 and winding 28 is great enough to prevent the reclosing of the circuit breaker. However, when the push button switch 30 is opened manually, the current in winding 28 is interrupted and the resulting decreased current in windings 26 and 26a permits an increased current to pass in the winding 4 and close the circuit breaker 3. If an excessive reverse current or an excessive current in the normal direction again passes in the main controlled circuit, the circuit breaker will be opened in the manner already described.

Although three-legged forms of reactors have been disclosed, it will be understood that any other suitable forms of reactors may be used.

In the foregoing illustrations, it has been assumed that a battery charging circuit is subjected to the control but it will be understood that there are various other applications of the invention where it is desired to control a circuit when a reverse current passes, or where such control is desired in combination with overload control of the charging current. For the sake of simplicity, the switch of the charging circuit has been described as controlled by a solenoid winding subjected to the controlling current. However, this winding and controlled device may be of any desired form and the winding may be a trip coil of a circuit breaker or the winding of a relay for controlling contacts or other parts which in any way serve to effect the desired purpose.

Although illustrative embodiments of this invention have been described, it will be understood that various modifications thereof may be made for adaptation to particular requirements without departing from the scope of the invention.

I claim:

1. Controlling apparatus comprising a circuit, a switch for affecting the connections of said circuit, power input means for connection to an alternating current source, a reactor having a main winding connected to be supplied with current from said input means, a rectifier connected to be supplied with current from said winding, a controlling winding on said reactor, means for coupling said controlling winding with said circuit to supply said controlling winding with direct current derived from said circuit and responsive to change in value of the current in said circuit, and means comprising a controlled winding affected by the output of said rectifier for affecting the movement of said switch when the current in said circuit attains a predetermined value, said controlled winding being normally energized by current derived from said power input means and affecting the movement of said switch upon failure of voltage of said source.

2. Controlling apparatus comprising a circuit, a switch for affecting the connections of said circuit, power input means for connection to an alternating current source, a reactor having a main winding connected to be supplied with current from said input means, a rectifier connected to be supplied with current from said winding, a controlling winding on said reactor, means for coupling said controlling winding with said circuit to supply said controlling winding with direct current derived from said circuit and responsive to change in value of the current in said circuit, a second reactor having a main winding connected to be supplied with current from said input means, a controlling winding on said second reactor, means for coupling said second controlling winding to said rectifier to supply said second controlling winding with direct current derived from said rectifier, and a controlled winding connected in a circuit in shunt to said last named main reactor winding for affecting the movement of said switch when the current in said first-named circuit attains a predetermined value.

3. Controlling apparatus comprising a circuit, a switch for affecting the connections of said circuit, power input means for receiving alternating current, a reactor having a main winding adapted to be supplied with current from said input means, a rectifier adapted to be supplied with current from said winding, a controlling winding on said reactor, means for coupling said controlling winding with said circuit to supply said controlling winding with direct current derived from said circuit and responsive to change in value of the current in said circuit, a second reactor having a main winding adapted to be supplied with alternating current from said input means, a controlling winding on said second reactor, means for coupling said second controlling winding to said rectifier to supply said second controlling winding with direct current derived from said rectifier, and a controlled winding connected in a circuit in shunt to said last named main reactor winding for normally restraining said switch in one position and for releasing said switch when the current in said first-named circuit attains a predetermined value.

4. Controlling apparatus comprising a circuit, a switch for affecting the connections of said circuit, power input means for connection to an alternating current source, a reactor having a main winding connected to be supplied with current from said input means, a rectifier connected to be supplied with current from said winding, a controlling winding on said reactor, means for coupling said controlling winding with said circuit to supply said controlling winding with direct current derived from said circuit and responsive to change in value of the current in said circuit, a second reactor having a main winding connected to be supplied with alternating current from said input means, a controlling winding on said second reactor, means for coupling said second controlling winding to said rectifier to supply said second controlling winding with direct current derived from said rectifier, an additional controlling winding on said first named reactor adapted to be supplied with direct current derived from said rectifier, and a controlled winding connected in a circuit in shunt to said last named main reactor winding for affecting the movement of said switch when the current in said first-named circuit attains a predetermined value.

5. Controlling apparatus comprising a circuit, a switch for opening and closing said circuit, power input means for connection to an alternating current source, a reactor having a main winding connected to be supplied with current from said input means, a rectifier connected to be supplied with current from said winding, a controlling winding on said reactor, means for coupling said controlling winding with said circuit to supply said controlling winding with direct current derived from said circuit and responsive to change in value of the current in said circuit, and means comprising a controlled winding affected by the output of said rectifier for normally restraining said switch in its closed position and for releasing said switch when the current in said circuit attains a predetermined value.

6. Controlling apparatus comprising a circuit, a switch for affecting the connections of said circuit, power input means for connection to an alternating current source, a reactor having a main winding connected to be supplied with current from said input means, a rectifier connected to be supplied with current from said winding, a controlling winding on said reactor, means for coupling said controlling winding with said circuit to supply said controlling winding with direct current derived from said circuit and responsive to change in value of the current in said circuit, an additional controlling winding on said reactor means for coupling said additional controlling winding to said rectifier to supply said second controlling winding with direct current derived from said rectifier, and means comprising a controlled winding affected by the output of said rectifier for affecting the movement of said switch when the current in said circuit attains a predetermined value.

7. Reverse current controlling apparatus comprising a circuit subjected to normal direct current in one direction and to a reverse current, a switch for affecting the connections of said circuit, power input means for connection to an alternating current source, a reactor having a main winding connected to be supplied with current from said input means, a rectifier connected to be supplied with current from said winding and connected to said winding and to said input means to cause intermittent currents to pass in said main winding in one direction only, a controlling winding on said reactor, means for coupling said controlling winding to said circuit to supply said controlling winding with direct current derived from said circuit and responsive to change in value and in direction of the current in said circuit, the magnetomotive force of said controlling winding being in opposition to the magnetomotive force of said main winding when the current in said circuit is in the normal direction and in addition thereto when the current in said circuit is in the reverse direction, and means comprising a controlled winding affected by the output of said rectifier for affecting the movement of said switch when the current in said circuit attains a predetermined value in the reverse direction.

8. Reverse current controlling apparatus comprising a circuit subjected to normal direct current in one direction and to a reverse current, a switch for affecting the connections of said circuit, power input means for connection to an alternating current source, a reactor having a main winding connected to be supplied with current from said input means, a rectifier connected to be supplied with current from said winding and connected to said winding and to said input means to cause intermittent currents to pass in said main winding in one direction only, a controlling winding on said reactor, means for coupling said controlling winding to said circuit to supply said controlling winding with direct current derived from said circuit and responsive to change in value and in direction of the current in said circuit, the magnetomotive force of said controlling winding being in opposition to the magnetomotive force of said main winding when the current in said circuit is in the normal direction and in addition thereto when the current in said circuit is in the reverse direction, a biasing winding on said reactor supplied with direct current and having its magnetomotive force in opposition to the magnetomotive force of said main winding, and means comprising a controlled winding affected by the output of said rectifier for affecting the movement of said switch when the current in said circuit attains a predetermined value in the reverse direction.

9. Controlling apparatus comprising a circuit subjected to a normal direct current in one direction and to a reverse current, a switch for affecting the connections of said circuit, power input means for receiving alternating current, a reactor having a main winding connected to receive current through said input means, a controlling winding on said reactor, a one-way electric valve in the circuit of said controlling winding and connected to said first named circuit for supplying current to said controlling winding when a reverse current passes in said first named circuit, a second controlling winding on said reactor, a one-way electric valve in the circuit of said last named controlling winding and connected to said first named circuit for supplying current to said last named controlling winding when a current in the normal direction passes in said first named circuit, and means comprising a controlled winding affected by the output of said main winding for affecting the movement of said switch when the reverse current in said first named circuit attains a predetermined value and when current in the normal direction in said first named circuit attains a predetermined value different from said predetermined reverse current value.

10. Controlling apparatus comprising a circuit subjected to a normal direct current in one direction and to a reverse current, a switch for affecting the connections of said circuit, power input means for connection to an alternating current source, a reactor having a main winding connected to be supplied with current from said input means, a rectifier connected to be supplied with current from said winding and connected to said winding and said input means to pass current in one direction only through said main winding, a controlling winding on said reactor, a one-way electric valve in the circuit of said controlling winding and connected to said first named circuit for supplying current to said controlling winding when a reverse current passes in said first named circuit, a second controlling winding on said reactor, a one-way electric valve in the circuit of said second named controlling winding and connected to said first named circuit for supplying current to said second named controlling winding when current passes in said first named circuit in the normal direction, the magnetomotive force of said first named controlling winding being additive to the magnetomotive force of said main winding and the magnetomotive force of said second controlling winding being opposed to the magnetomotive force of said main winding; and means comprising a controlled winding affected by the output of said rectifier for affecting the movement of said switch when the reverse current in said circuit attains a predetermined value and when the current in the normal direction in said circuit attains a predetermined value different from said predetermined reverse current value.

11. Reverse current controlling apparatus comprising a circuit subjected to normal direct current in one direction and to a reverse current, a switch for affecting the connections of said circuit, power input means for connection to an alternating current source, a reactor having a main winding connected to be supplied with current from said input means, a rectifier connected to be supplied with current from said winding and connected to said winding and to said input means to cause intermittent currents to pass in said main winding in one direction only, a controlling winding on said reactor supplied with direct current derived from said circuit and responsive to change in value and in direction of the current in said circuit, the magnetomotive force of said controlling winding being in opposition to the magnetomotive force of said main winding when the current in said circuit is in the normal direction and in addition thereto when the current in said circuit is in the reverse direction, a second reactor having a main winding connected to be supplied with current from said input means, a second rectifier connected to be supplied with current from said last named winding and connected to said winding and to said input means to cause intermittent currents to pass in said last named main winding in one direction only, a controlling winding on said second reactor supplied with current from said first named rectifier, the magnetomotive force of said last named controlling winding being additive to the magnetomotive force of said last named main winding, and means comprising a controlled winding affected by the output of said second rectifier for affecting the movement of said switch when the current in said circuit attains a predetermined value in the reverse direction.

12. Controlling apparatus comprising a circuit subjected to a normal direct current in one direction and to a reverse current, a switch for affecting the connections of said circuit, power input means for receiving alternating current, a reactor having a main winding connected to be supplied with current from said source, a rectifier connected to be supplied with current from said winding, a controlling winding on said reactor, a one-way electric valve in the circuit of said controlling winding and connected to said first named circuit for supplying current to said controlling winding when a reverse current passes in said first named circuit, a second controlling winding on said reactor, a one-way electric valve in the circuit of said last named controlling winding and connected to said first named circuit for supplying current to said last named controlling winding when the current in the normal direction passes in said first named circuit, a second reactor having a main winding connected to be supplied with current from said input means, a controlling winding on said second reactor connected to be supplied with current from said rectifier, a second rectifier connected to be supplied with current from said main winding on said second reactor, and means comprising a controlled winding affected by the output of said second rectifier for affecting the movement of said switch when the reverse current in said first named circuit attains a predetermined value and when current in the normal direction in said first named circuit attains a predetermined value different from said predetermined reverse current value.

13. Controlling apparatus comprising a circuit, a switch for affecting the connections of said circuit, power input means for connection to an alternating current source, a reactor having a main winding connected to be supplied with current from said input means, a rectifier connected to be supplied with current from said winding, a controlling winding on said reactor, means for coupling said controlling winding to said circuit to supply said controlling winding with direct current derived from said circuit and responsive to change in value of the current in said circuit, a second reactor having a main winding connected to be supplied with current from said input means, a controlling winding on said second reactor, means for coupling said controlling winding to said rectifier to receive direct current from the output of said rectifier, an additional winding on said first named reactor connected to be supplied with direct current from the output of said rectifier through said second controlling winding, and means comprising a controlled winding affected by an increase in current in said main winding on said second reactor for affecting the movement of said switch.

FRANK G. LOGAN.

REFERENCES CITED

The following references are of record in the file of this patent:

UNITED STATES PATENTS

| Number | Name | Date |
| --- | --- | --- |
| 1,540,307 | Beall | June 2, 1925 |
| 1,551,297 | Fortescue | Aug. 25, 1925 |
| 1,691,735 | Oberschmidt | Nov. 13, 1928 |
| 1,715,684 | Thomas | June 4, 1929 |
| 1,728,745 | Brown et al. | Sept. 17, 1929 |
| 1,756,924 | McNairy | Apr. 26, 1930 |
| 2,229,952 | Whiteley et al. | Jan. 28, 1941 |
| 2,247,983 | Barth | July 1, 1941 |
| 2,310,955 | Hornfeck | Feb. 16, 1943 |
| 2,341,526 | Breitenstein | Feb. 15, 1944 |
| 2,425,743 | Knight et al. | Aug. 19, 1947 |
| 2,464,639 | Fitzgerald | Mar. 15, 1949 |